May 21, 1968     H. LAMM     3,384,054
MIXTURE-COMPRESSING ROTARY PISTON INJECTION-TYPE
INTERNAL COMBUSTION ENGINE
Filed June 10, 1966
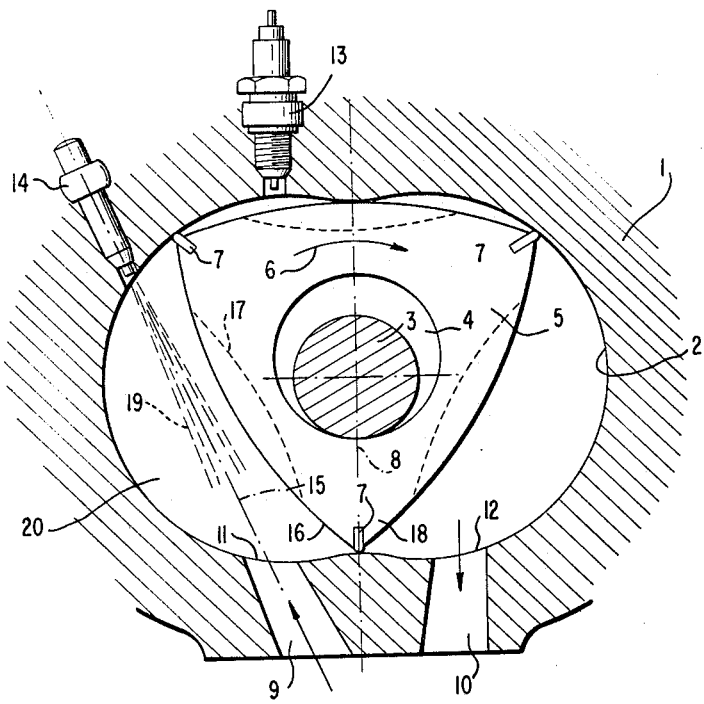
INVENTOR
HEINZ LAMM
BY *Dicke + Craig*
ATTORNEYS

United States Patent Office 3,384,054
Patented May 21, 1968

3,384,054
MIXTURE-COMPRESSING ROTARY PISTON INJECTION - TYPE INTERNAL COMBUSTION ENGINE
Heinz Lamm, Esslingen-St. Bernhardt, Germany, assignor to Daimler-Benz Aktiengesellschaft, Stuttgart-Unterturkheim, Germany
Filed June 10, 1966, Ser. No. 556,630
Claims priority, application Germany, June 19, 1965, D 47,550
3 Claims. (Cl. 123—8)

ABSTRACT OF THE DISCLOSURE

A mixture-compressing rotary piston injection-type internal combustion engine of trochoidal construction in which a polygonal piston of triangular shape slides with its corners along a two-arched case surface formed by the engine housing consisting of a casing and lateral parts, whereby the piston rotates on the eccentric of an eccentric shaft relative to the latter and to the housing and in its rotation valves the inlet and outlet channels whose orifices lie in the casing surface; an injection nozzle is arranged in the housing such that the center longitudinal axes of the inlet channel of the injection nozzle are arranged substantially coaxially which does not contact the piston, as viewed in cross section through the internal combustion engine when the piston rests with one of its corners within the area of the minor axis of the housing.

The present invention relates to a mixture-compressing rotary piston injection-type internal combustion engine of trochoidal construction in which, within a housing formed by a case and lateral parts, a triangular piston which is supported on the eccentric of an eccentric shaft and controlled by a transmission rotates relative to the eccentric shaft and to the housing, glides with its corner along the cam surface of the case having a two-arched contour, and in which additionally an inlet channel is arranged within the housing case whose control aperture lies within the cam surface of the case and an injection nozzle is arranged in the housing case.

The present invention principally aims at improving the mixture preparation with direct gasoline injection. As solution to the underlying problems the present invention essentially consists in that the center longitudinal axis of the inlet channel and the center longitudinal axis of the injection nozzle lie in a common axis which—as viewed in cross section through the internal combustion engine perpendicularly to the axis thereof—does not contact the piston when the latter is disposed with one of its corners within the area of the minor axis of the cross-over side.

There is achieved by the mutual coordination of the inlet channel to the injection nozzle that during the suction stroke or phase, the fuel (gasoline) is injected out of the injection nozzle past the flank of the piston, i.e., without any impairment whatsoever by the piston, transversely across the suction space and in a direction opposite the flow or stream of combustion air leaving the control aperture of the inlet channel. The fuel particles disposed within the outer area of the fuel jet become detached from the fuel jet along the path through the suction space and mix with the oppositely directed air particles to which is imparted an eddying or vortexing motion in a conventional manner. The fuel particles which flow directly past the piston flank, thereby impinge in part on the piston flank or on a piston recess provided in the piston flank and evaporate thereat. The fine fuel droplets of the fuel jet combine with the air vortices that are present above the piston flank or are produced by a piston recess or trough, whereas the larger fuel drops, by reason of the larger kinetic energy thereof, reach up to in from of the inlet channel and even in part penetrate into th( inlet channel where they are torn apart within the are: of the largest air velocity and mix intimately with th( combustion air.

Accordingly, it is an object of the present invention t( provide a rotary piston internal combustion engine witl gasoline fuel injection which avoids by simple means th( shortcomings encountered heretofore in the prior art, par ticularly as regards mixture preparation.

Another object of the present invention resides in ai injection-type rotary piston internal combustion engine ii which the mixture preparation with direct gasoline injec tion is considerably improved without requiring compli cated and costly means.

A further object of the present invention resides in ; rotary piston internal combustion engine of the type de scribed above in which the inlet channel and injectioi nozzle are so coordinated to each other that an intimat( mixing of the fuel and air can be realized without an substantial impairment by surfaces of the piston.

These and further objects, features, and advantages o the present invention will become more obvious from th( following description when taken in connection with th( accompanying drawing which shows, for purposes of illus tration only, one embodiment in accordance with the pres ent invention, and wherein:

The single figure is a schematic cross-sectional viev through a mixture-compressing rotary piston internal com bustion engine of the injection type in accordance witl the present invention.

Referring now to the drawing, the housing of the in ternal combustion engine is formed essentially by the cas( 1 having a two-arched contact or cam surface 2 and o two lateral parts (not shown) attached to the case 1 ii the axial direction on both sides thereof. The eccentri shaft 3 is conventionally supported in the lateral parts The triangularly shaped piston 5 is rotatably arrange( on the eccentric 4 of the shaft 3. The piston 5, controlle( by means of a conventional transmission (not shown) rotates relative to the eccentric shafts 3 and to the housin 1 in the direction of arrow 6 and thereby slides along th cam surface 2 with the radial seals 7 arranged at th( piston corners thereof. The cross-over side of the engin is constituted in the case 1 by the inlet channel 9 and th outlet channel 10 on both sides of the minor axis 8. Botl the control aperture 11 of the inlet channel 9 as also th control aperture 12 of the outlet channel 10 are dispose( in the cam surface 2 and are controlled or valved by th piston 5, when the latter rotates in the direction of rota tion 6. The spark plug 13 is arranged in the case 1 at th ignition side thereof within the area of the minor axis : opposite the cross-over side. Furthermore, the injectio: nozzle 14 is arranged within the area of the relativel cooler arched portion of the case 1 between the inlt channel 9, and the spark plug 13.

The inlet channel 9 and the injection nozzle 14 are s constructed and arranged as regards their orientation tha the center longitudinal axis through the inlet channel and the center longitudinal axis through the injection noz zle 14 lie within, i.e., coincide with the same axis 1 which does not contact the piston 5, i.e., the flank 1 or the piston recess 17 thereof, when the piston 5 is dis posed with its corner 18 on the minor axis 8 at the cros: over side between the control aperture 12 of the outlt channel 10 and the control aperture 11 of the inlet chan nel 9. By means of this measure the fuel jet 19 injecte out of the injection nozzle 14 reaches transversely throug the suction space 20 of the engine housing and encounter: without any impairment by the piston 5, the combustio air flowing in the opposite direction out of the inlet channel 9 so that the advantages of the engine described hereinabove are achieved as regards a favorable mixture preparation.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A mixture-compressing rotary-piston injection-type internal combustion engine of trochoidal construction, comprising housing means including case means provided with multi-arched internal cam track means having a cross-over side, eccentric shaft means supported in said housing means and provided with eccentric means, polygonal piston means rotatably supported on said eccentric means, control means for controlling the rotation of said piston relative to said eccentric shaft means and to said housing means in such a manner that the piston corners slide at all times along said internal cam track means, said case means being provided with inlet and exhaust channel means each provided with control aperture means, and injection nozzle means in said case means, the center longitudinal axis of the inlet channel means and the center longitudinal axis of the respective injection nozzle means being disposed substantially in a common axis which, as viewed in cross section through the internal combustion engine, is devoid of any contact with said piston means when the latter is located with one of its piston corners within the area of the cross-over side.

2. An internal combustion engine according to claim 1, wherein said cam track means is of two-arched construction, and wherein said piston means is of triangular shape, said piston means valving with the piston corners thereof said inlet and exhaust channel means.

3. In a mixture-compressing rotary piston internal combustion engine of trochoidal construction having direct fuel injection, in which a polygonal piston is rotatably supported on an eccentric of an eccentric shaft within an engine housing provided with an internal contact surface of multi-arched configuration, and in which the relative rotation of the piston with respect to the eccentric shaft and housing is controlled in such a manner that the piston slides with its piston corners at all times along the internal contact surface of the housing, and in which further an inlet channel and an outlet channel are provided within said housing, the improvement essentially consisting of fuel injection means having a center longitudinal axis which essentially coincides with the center longitudinal axis of the inlet channel, said fuel injection means and the inlet channel being so arranged within said housing that the longitudinal axes thereof form approximately a common axis substantially unimpaired by and contact-free from said piston with the latter in a position in which a piston corner is disposed within the area between the outlet channel and the inlet channel as viewed in the normal direction of rotation of the piston.

References Cited
UNITED STATES PATENTS 3,174,466  3/1965  Scherenberg _____ 123—8

RALPH D. BLAKESLEE, *Primary Examiner.*